(12) United States Patent
Okabe

(10) Patent No.: US 8,322,379 B2
(45) Date of Patent: Dec. 4, 2012

(54) DIVERTER VALVE

(76) Inventor: Shuichi Okabe, Kawaguchi (JP)

( * ) Notice: Subject to any disclaimer, the term of this patent is extended or adjusted under 35 U.S.C. 154(b) by 660 days.

(21) Appl. No.: 12/352,040

(22) Filed: Jan. 12, 2009

(65) Prior Publication Data

US 2010/0032033 A1 Feb. 11, 2010

(30) Foreign Application Priority Data

Aug. 6, 2008 (JP) ................................. 2008-202693

(51) Int. Cl.
*F16K 1/00* (2006.01)
(52) U.S. Cl. .......................... 137/874; 137/875; 406/182
(58) Field of Classification Search .................. 137/874, 137/875, 876; 285/184; 406/182
See application file for complete search history.

(56) References Cited

U.S. PATENT DOCUMENTS

| 481,625 | A | * | 8/1892 | Maxfield | 356/142 |
| 683,666 | A | * | 10/1901 | Shannon | 406/182 |
| 2,586,144 | A | * | 2/1952 | Benoit | 406/154 |
| 3,146,033 | A | * | 8/1964 | Larsson | 406/182 |
| 3,874,490 | A | * | 4/1975 | McAlister | 193/23 |
| 4,442,865 | A | * | 4/1984 | Shigeo | 137/874 |
| 4,718,457 | A | * | 1/1988 | Luger | 137/875 |
| 5,226,759 | A | * | 7/1993 | Hilmer et al. | 406/182 |
| 5,857,490 | A | * | 1/1999 | Kao | 137/625.45 |

FOREIGN PATENT DOCUMENTS

| GB | 2190726 A | * | 11/1987 |
| GB | 2330397 A | * | 4/1999 |

* cited by examiner

*Primary Examiner* — John Fox
*Assistant Examiner* — R.K. Arundale
(74) *Attorney, Agent, or Firm* — Holtz, Holtz, Goodman & Chick, PC

(57) ABSTRACT

A diverter valve for a material transportation system includes a front cover defining an inlet passage, a rear cover defining first and second outlet passages, a casing connected to the front and rear covers and an inner tube arranged in the casing. The inner tube rotates to selectively align an outlet thereof with the first or second outlet passage. An inlet of the inner tube aligns with the inlet passage and the first outlet passage to thereby provide a straight passage through the diverter valve which aligns with a straight passage through the transportation system. When the inlet of the inner tube aligns with the second outlet passage, it provides a straight, branched passage through the diverter valve to, e.g., a receiving container. The inner tube is rotated between its alignment with the first or second outlet passage by an actuator.

17 Claims, 8 Drawing Sheets

DIVERTER VALVE

FIELD OF THE INVENTION

The present invention relates generally to a diverter valve or passage changing device for a powder or particle transportation system. More particularly, the present invention relates to a diverter valve which provides two different passages through which powder or particles flow from a source thereof to multiple outlet conduits or passages.

BACKGROUND OF THE INVENTION

A typical powder or particle transportation system is shown in FIG. 5. The powder or particle transportation system is connected to a source of powder or particles (not shown) and a plurality of delivery points, such as a plurality of receiving containers or hoppers 20. The transportation system creates a controlled flow of the powder or particles from the source (not shown) to the receiving containers 20. To enable the powder or particles to flow into each container 20, the transportation system usually includes a series of pipe lines 22 and one or more diverter valves 24 connected to the pipe lines 22. Each diverter valve 24 is associated with a respective container 20, e.g., arranged above the respective container 20, so that the powder or particles flow(s) from the diverter valve 24 into the container 20 aided by gravity.

When compressed gas is used to aid in the flow of the powder or particles through the pipe lines and diverter valves, a system for mixing the powder or particles with compressed gas is also provided (not shown).

When used to fill the containers with powder, the diverter valve associated with a first one of the containers is configured to allow the powder to flow from the pipe lines into that container. When that container is filled with powder, the diverter valve associated with that container is reconfigured to stop the supply of powder to the container and to provide a conduit through the diverter valve from a pipe line before the diverter valve to another pipe line after the diverter valve. Then, another diverter valve associated with another, empty container is configured to allow the powder to flow from the pipe lines into that container and powder is thus introduced into that empty container. This process continues, for example, until the containers are filled with powder, after which the containers are removed and empty containers are put in their place.

FIGS. 6-9 show a conventional diverter valve which includes a ball valve having a body casing 13 and a ball disk 12 enclosed in the body casing 13. A curved passage 10 is defined by the ball disk 12. The ball disk 12 is rotated by a stem 12a (see FIG. 7) that projects outward from the body casing 13 and is connected to an operating device such as motor, air actuator or air cylinder (not shown).

The casing of the diverter valve has three branches, namely an inlet branch 15A, a first outlet branch 15B and a secondary outlet branch 15C, all of which are connected to the body casing 13, e.g., by bolts as shown.

The ball valve has two operating positions. In a first operating position shown in FIG. 8, the passage 10 of the ball disk 12 connects the inlet branch 15A and the first outlet branch 15B to thereby provide a first passage through the diverter valve. In a second operating position shown in FIG. 9, which is obtained by turning the ball disk 12 via stem 12A, the passage 10 of the ball disk 12 connects the inlet branch 15A and the secondary outlet branch 15C to provide a second passage which leads to, for example, a receiving container (not shown). By adjusting the position of the ball disk 12, the passage 10 for the powder is changed to provide, for example, either a flow through the diverter valve or a flow into a receiving container.

There are significant drawbacks of such conventional ball valves in diverter valves. For example, when powder flows through a transportation system including a plurality of pipe lines and diverter valves, the powder often passes through several ball valves from the source to a container and impacts an inner wall of each ball valve twice, i.e., at a curve in passage 10 in the ball disk 12 and at a curve in outlet branch 15B or in outlet branch 15C. Such impacts damage the powder. This damage is heightened when there are many valves in each pipe line because the greater number of valves, the greater number of impacts of the powder against the inner walls thereof. When transporting rice, for example, the impact of the rice granules against the walls of the ball valves causes cracking, and since damaged rice is considered a low grade quality, it results in an economical loss.

Similarly, when transporting an adherent powder through the transportation system, such as calcium hydroxide, the powder sticks to the inner walls of the ball valves and causes significant energy loss, and moreover can lead to clogging of one or more of the passages which would result in a complete stoppage of the transportation system.

Another drawback of such conventional diverter valves with ball valves arises from the fact that the interior pressure of the transportation system is higher than atmospheric pressure and to maintain the higher-than-atmospheric pressure in the interior of the transportation system and prevent leakage of air pressure, seal rings are arranged between the ball disk 12 and each of the inlet and outlet branches 15A, 15B, 15C. The tolerance of the deviation of the ball disk from a spherical shape is about 0.02 mm; however, even with special machining by experienced personnel, the tolerance limit is 0.005 mm so that there is invariably leakage of air pressure around the ball disk 12.

Furthermore, when transporting soft powder, a plastic seal ring is used. If the plastic seal ring is too soft, wearing of the seal ring occurs and therefore, the seal ring must have a certain degree of hardness. It is a drawback though that hard seal rings must be forcibly urged against the surface of the ball disk 12 using, for example, elasticity of the plastic material to minimize the leakage. This necessitates a strong force against the ball disk 12 to deform the seal ring and at the same time, a large torque to rotate the ball disk 12. To provide this, a large and expensive operating device is required.

On the other hand, when transporting a very hard powder such as polycarbonate, a plastic seal ring cannot be used because it wears out quite quickly. Metal seal rings are therefore used instead of plastic seal rings, but a major problem with metal seal rings is that the amount of gas leaking through the seal rings is significantly higher than if plastic seal rings are used because the metal seal rings do not have any flexibility. The inability to reduce the clearance between the ball disk and the metal seal ring in view of machining constraints, as described above, also results in gas leakage.

OBJECTS AND SUMMARY OF THE INVENTION

It is an object of the present invention to provide a new and improved diverter valve for use in, for example, a powder or particle transportation system, and in particular, a transportation system in which compressed gas is used to convey the powder or particles.

It is another object of some embodiments of the present invention to provide a new and improved diverter valve for a powder or particle transportation system which avoids the problems of conventional diverter valves for such transportation systems as described above.

It is yet another object of some embodiments of the present invention to provide a new and improved diverter valve which can be used for a powder transportation system and also for other fluid transportation systems.

In order to achieve at least one of the foregoing objects, and possibly others, a diverter valve for a material transportation system in accordance with the invention includes a front cover defining an inlet passage, a rear cover defining first and second outlet passages, an elongate casing connected at a first end to the front cover and at a second end to the rear cover, and an inner tube arranged in the casing. An inlet of the inner tube aligns with the inlet passage of the front cover. The inner tube is rotatable to selectively align an outlet thereof with the first or second outlet passage of the rear cover.

The inner tube preferably defines a straight passage between its inlet and outlet, and thereby avoids the operational drawbacks of a curved passage in a diverter valve as described above. The straight passage has a central axis which is inclined relative to an axis about which the inner tube rotates so that while the inlet of the inner tube remains in the same radial position in communication with a passage in the front cover, the outlet thereof moves to different radial positions into selective alignment with the first or second outlet passage of the rear cover. Rotation of the inner tube therefore enables the straight passage thereof to either align with a straight passage through pipe lines of the transportation system connected to the front and rear covers or provide a straight diversionary path to, for example, a receiving container.

In one embodiment of the invention, irrespective of the presence of a straight passage in the inner tube, flat, two-dimensional sliding surfaces are formed on adjacent parts of components of the diverter valve which rotate relative to one another. A sealing mechanism is advantageously arranged on one of these adjacent parts to seal against the flat sliding surface of the other part and thereby seal against leakage of gas between the adjacent parts, which gas is used to aid in the flow of the powder or particles through the transportation system. This avoids the drawbacks of the use of three-dimensional sealing surfaces as described above.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF PREFERRED EMBODIMENTS

Figure 1:
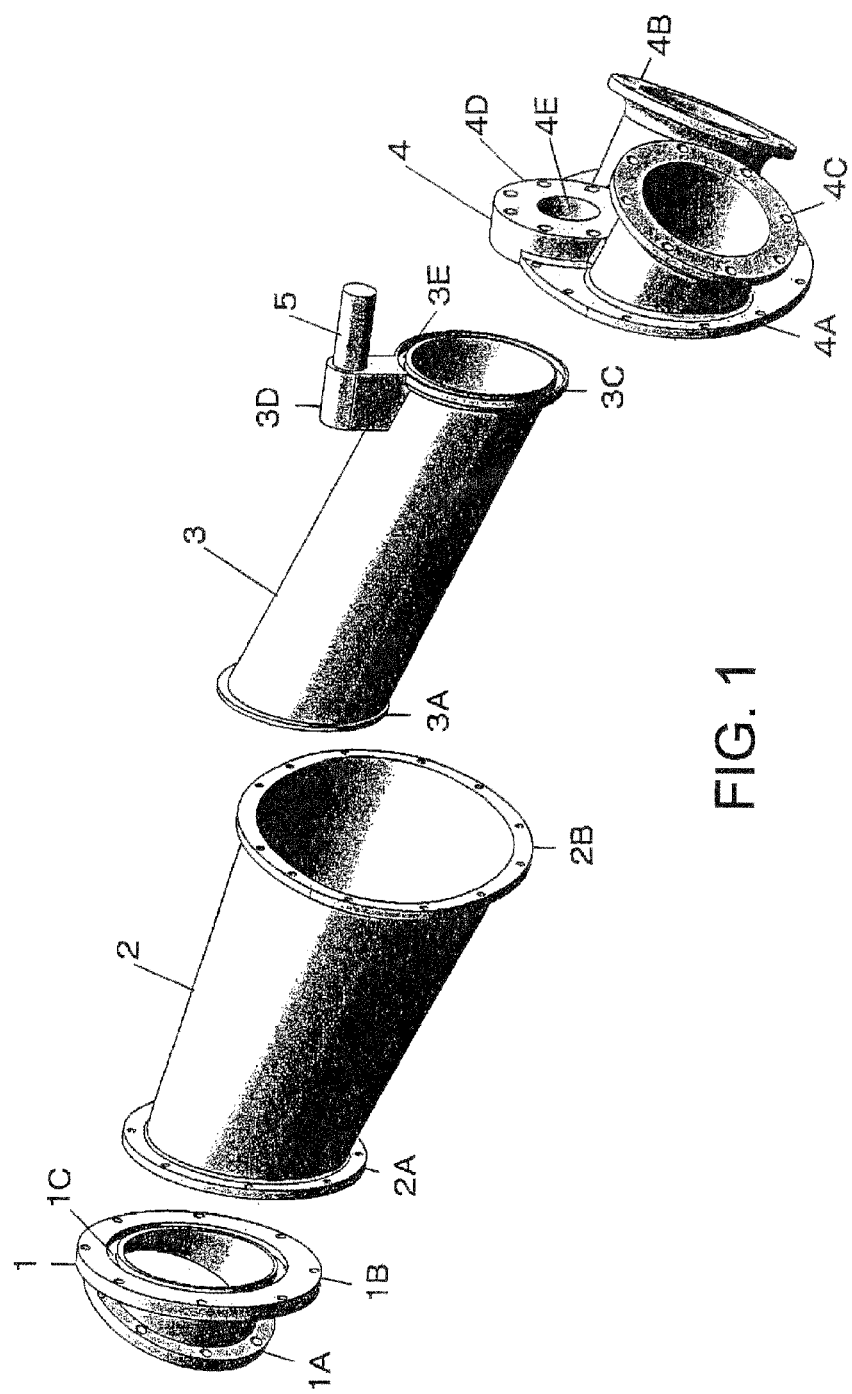
FIG. 1 is an exploded, perspective view of a diverter valve in accordance with the invention.
Figure 2:
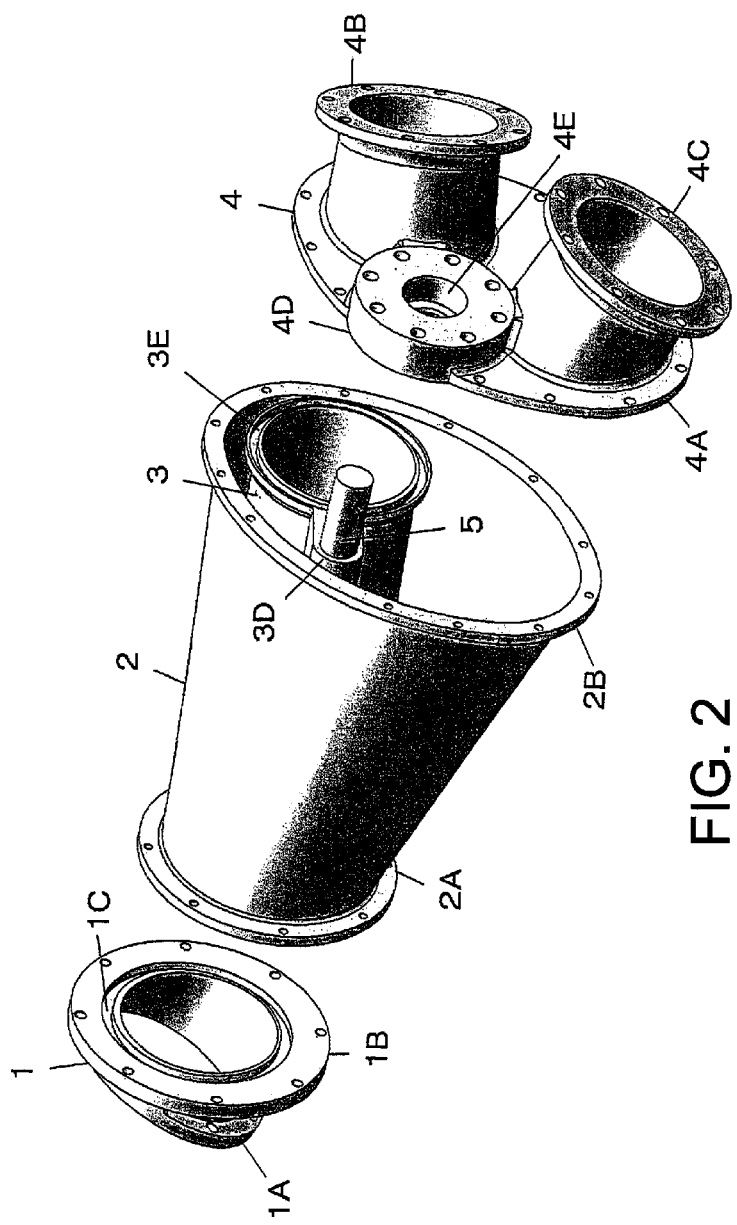
FIG. 2 is a perspective view of the diverter valve in accordance with the invention with the end flanges removed.
Figure 3:
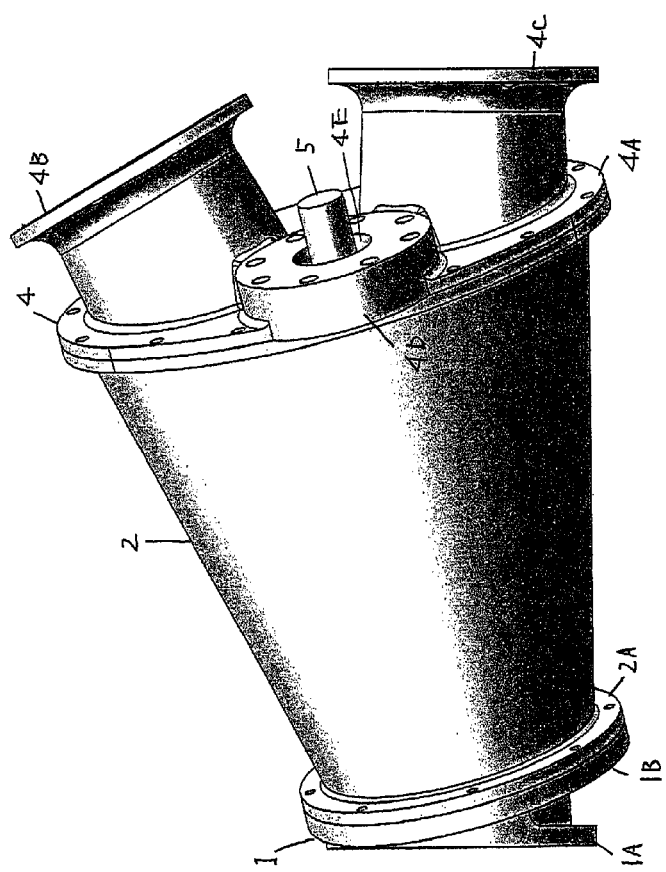
FIG. 3 is a front view of the diverter valve in accordance with the invention.
Figure 4:
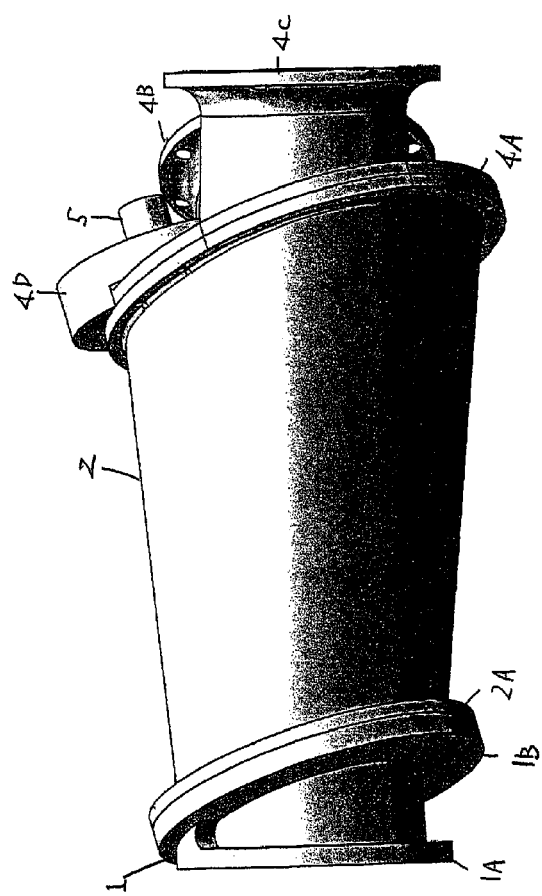
FIG. 4 is a side view of the diverter valve in accordance with the invention.

Referring to the accompanying drawings wherein like reference numerals refer to the same or similar elements, a diverter valve in accordance with the invention includes a first, front cover 1, a casing 2, an inner tube 3 arranged in the casing 2 and a second, rear cover 4.

Figure 5:
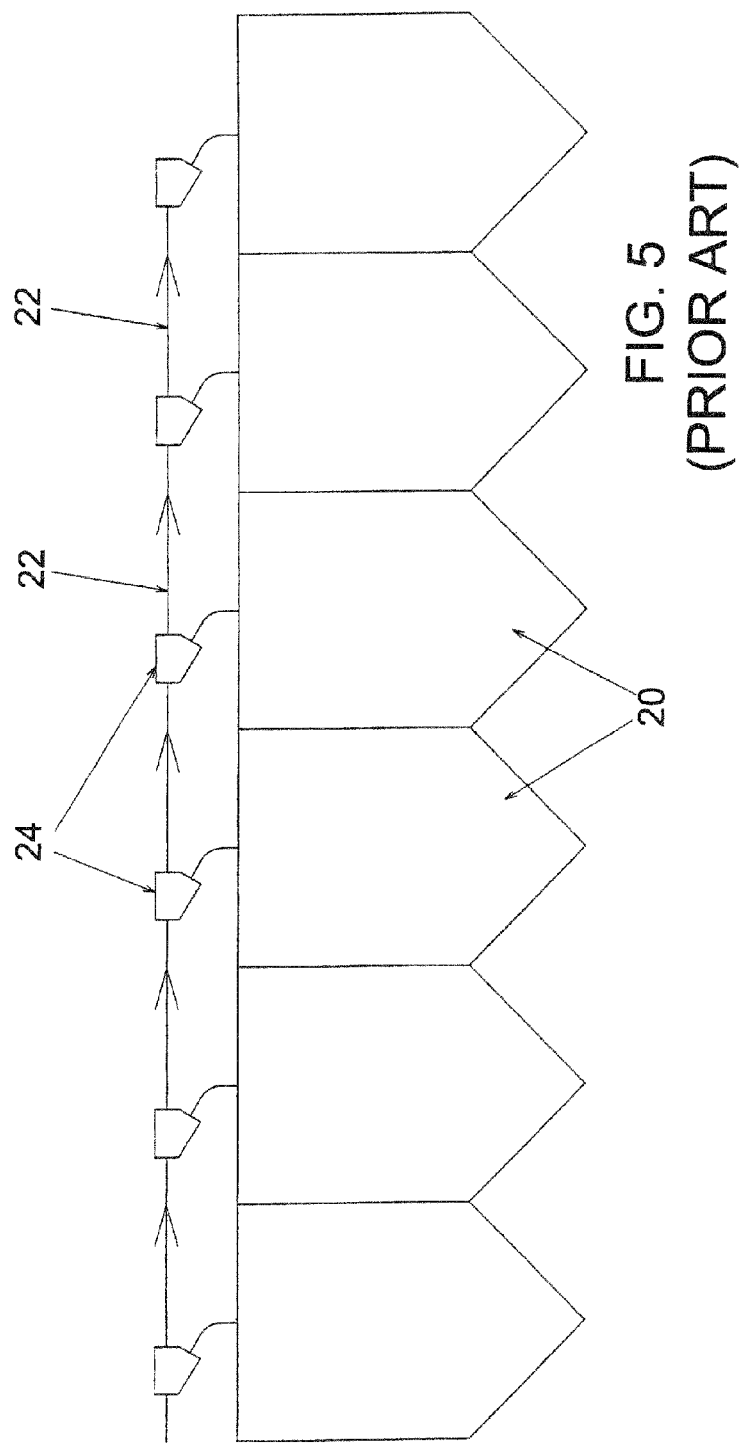
FIG. 5 shows an exemplifying layout of a powder or particle transportation system in which the diverter valve in accordance with the invention can be used.
Figure 6:
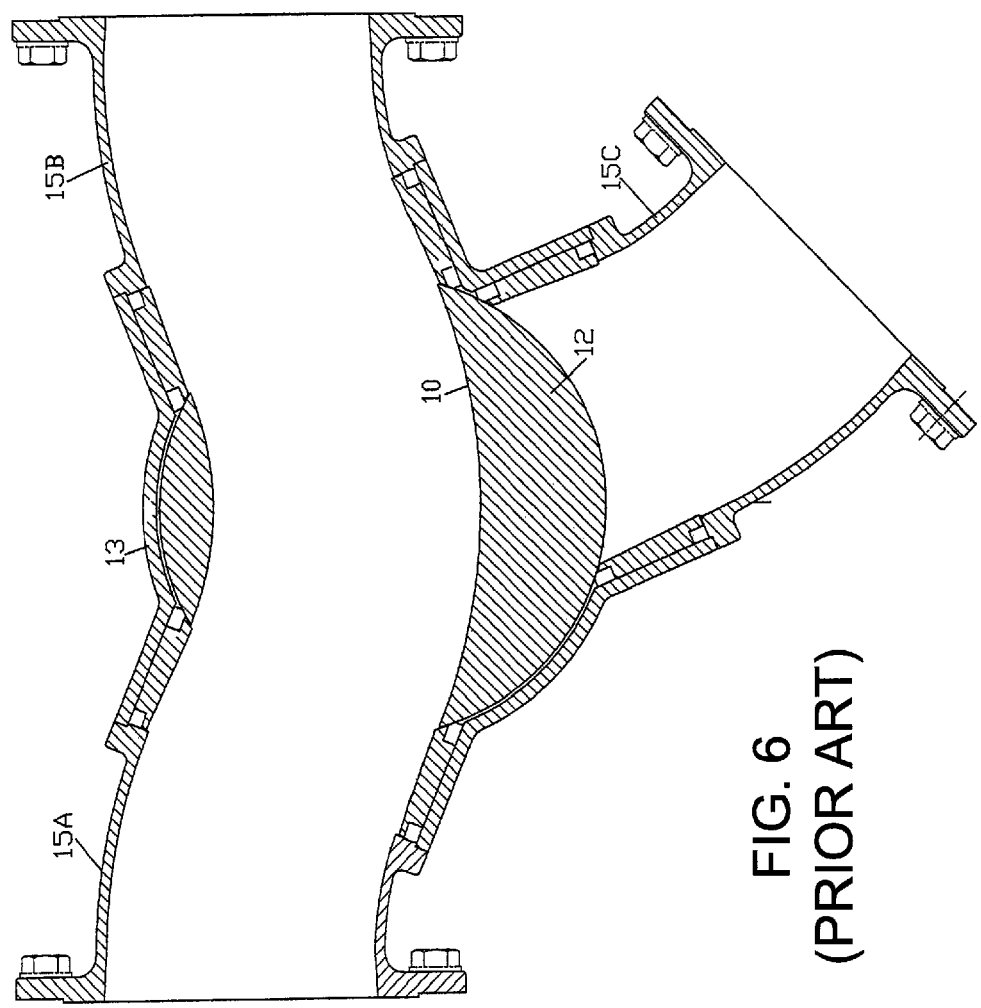
FIGS. 6 and 7 are cross-sectional views of a conventional ball valve having a ball disk, used in a powder or particle transportation system.
Figure 7:
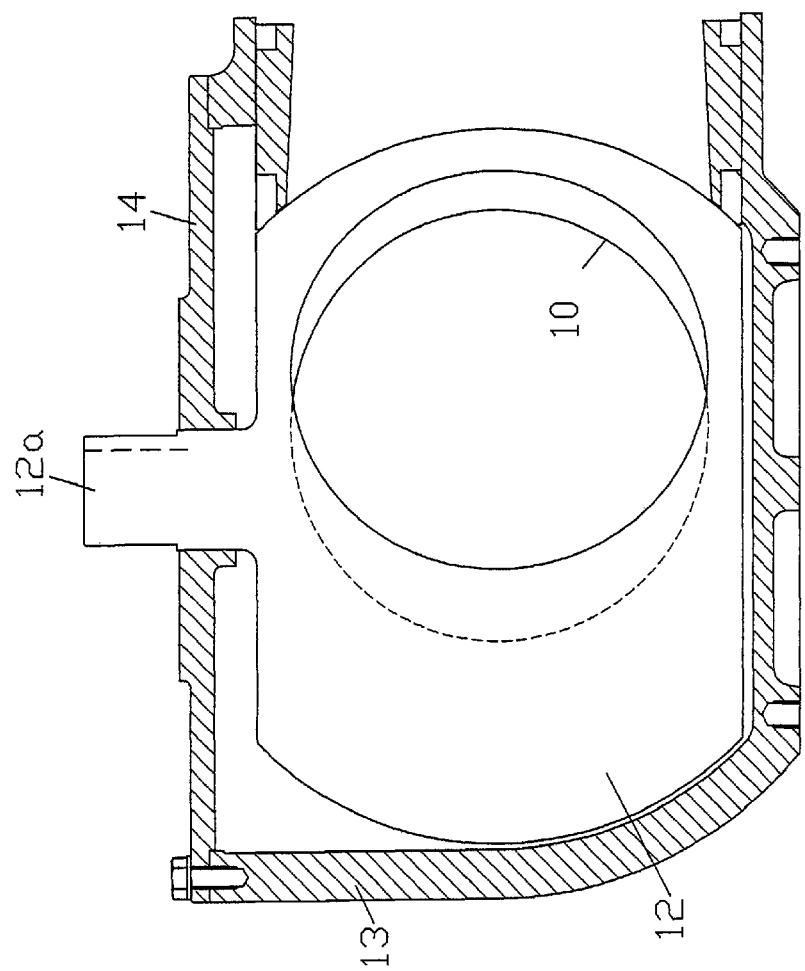
Figure 9:
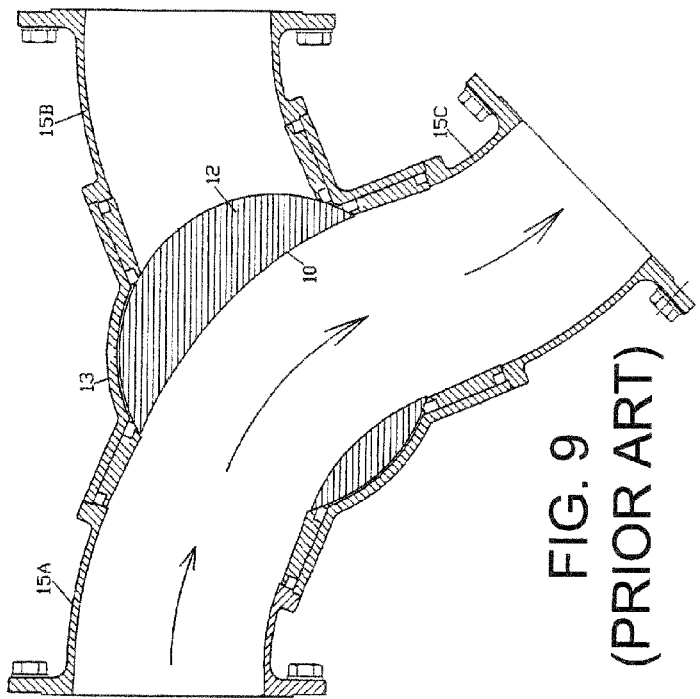
FIGS. 8 and 9 show the conventional ball disk in two states in which it provides two different passages therethrough.
Figure 8:
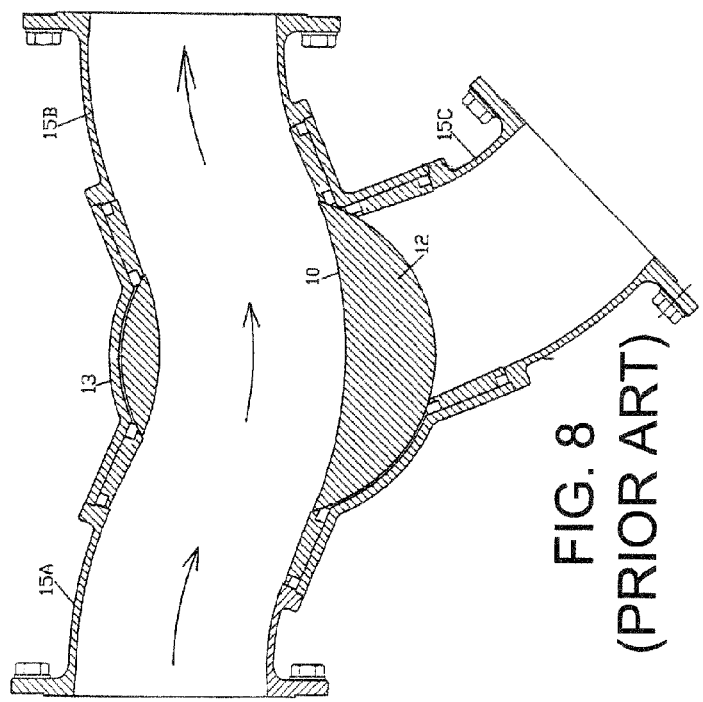

The front cover 1 has an inlet flange 1A, and an outlet flange 1B which is inclined relative to the inlet flange 1A, i.e., the plane defined by the outlet flange 1B at its edge is not parallel to the plane defined by the inlet flange 1A at its edge but rather these planes intersect. An annular groove 1C is formed in the outlet flange 1B. Bolt holes are formed in the inlet and outlet flanges 1A, 1B. The inlet flange 1A is connected to another part of the transportation system, e.g., a pipe line as shown in FIG. 5, via the bolt holes.

The casing 2 is shaped like a megaphone with a smaller circular opening at its front end adjacent the front cover 1 and a larger circular opening at its rear end adjacent the rear cover 4. Casing 2 thus may have a truncated conical shape, with a hollow interior. Casing 2 also includes an inlet flange 2A adjacent and connected to the outlet flange 1B of the front cover 1 and an outlet flange 2B. Inlet flange 2A and outlet flange 2B each define a plane at the edge which is substantially perpendicular to a rotational axis of the inner tube 3. Bolt holes are formed in the inlet and outlet flanges 2A, 2B. The bolt holes in the inlet flange 2A enable its connection to the outlet flange 1B of the front cover 1 via bolts passing through aligning bolt holes.

The inner tube 3 is enclosed in the casing 2, and thus situated between the front cover 1 and the rear cover 4, and is rotatable relative to the casing 2. The inner tube 3 includes an inlet flange 3A and an outlet flange 3C, and the inlet flange 3A and outlet flange 3C each define a plane at the edge which is substantially perpendicular to the rotational axis of the inner tube 3. The rotational axis of the inner tube 3 passes through a center of an opening defined by the inlet flange 3A but a center of an opening defined by the outlet flange 3C is apart from the rotational axis. As such, the opening defined by the outlet flange 3C is radially offset from the opening defined by the inlet flange 3A. Moreover, the central axis of a passage defined by the inner tube 3, in one configuration as discussed below, may coincide and align with the center of the straight passage of the pipe lines.

In view of the radial offset of the outlet flange 3C from the inlet flange 3A, the inner tube 3 defines a passage having a central axis, i.e., an axis between the center of the opening in the inlet flange 3A and the center of the opening in the outlet flange 3C, which is inclined relative to its rotational axis. That is, while the inlet of the passage at the inlet flange 3A is invariable relative to the rotational axis, the outlet of the passage at the outlet flange 3C varies relative to the rotational axis to different positions. This inclination of the passage relative to the rotational axis of the inner tube 3 enables the inner tube 3 to be rotated into at least two different positions to cause the outlet of the passage to be aligned with different outlet conduits and thereby provide either a straight passage through the diverter valve or a diversionary passage to, for example, a receiving container (discussed below).

A rotation mechanism is connected to the inner tube 3 to enable the inner tube 3 to be rotated relative to the casing 2. An exemplifying embodiment of the rotation mechanism is shown in FIGS. 1-4 and includes a rib 3D projecting from the outer surface of the inner tube 3 and a stem 5 coupled to the rib 3D and extending through an aperture 4E in the rear cover 4. Stem 5 is attached to an actuator or operating device (not shown) located outside of casing 2. In one embodiment, the inner tube 3 is constructed to be rotated by approximately 90° via the rib 3D and stem 5 between two different operating states. In another embodiment, the inner tube 3 is constructed to be rotated by approximately 60° via the rib 3D and stem 5 between two different operating states.

The rear cover 4 includes an inlet flange 4A adjacent and connected to the outlet flange 2B of the casing 2, two outlet conduits 4B, 4C and a flange 4D which defines the aperture 4E through which the stem 5 extends. Bolt holes are formed in the inlet flange 4A to enable its connection to the outlet flange 2B via bolts passing through aligning bolt holes in the outlet flange 2B and inlet flange 4A. The stem 5 is sealed in the aperture 4E by a suitable sealing and/or packing material or system (not shown).

With the foregoing structure, it is possible to provide straight passages through the diverter valve in accordance with the invention, and thereby eliminate curves in the flow path of powder or particles through a diverter valve as in conventional diverter valves discussed above. Elimination of such curves prevents damage to the powder or particles. To this end, one of two outlet conduits 4B, 4C of the rear cover 4 is selected to provide the straight passage through the diverter valve in alignment with the straight passage of the pipe lines of the transportation system, i.e., depending on the pipeline layout for the particular powder or particle transportation system, and the front cover 1 and rear cover 4 are positioned accordingly. The other outlet conduit will thus form a diversionary or branched passage leading, for example, to a container. The diverter valve will always provide a straight passage therethrough, but in one configuration, this straight passage will align with and form part of the straight passage of the pipe lines and in the other configuration, it will form a straight, branched passage to the container.

For example, if outlet conduit 4B is selected to provide the straight passage of the pipe lines, the front cover 1 is positioned such that the inlet flange 1A is perpendicular to a longitudinal axis of the straight passage of the pipe lines and the rear cover 4 is positioned such that the outlet conduit 4B is also perpendicular to the longitudinal axis of the straight passage of the pipe lines. As such, the passages defined by the front cover 1 and the outlet conduit 4B will be coaxial with the straight passage of the pipe lines. The openings in the inlet flange 1A and the outlet flange 4B will also be perpendicular to the longitudinal axis of the straight passage of the pipe lines.

On the other hand, if outlet conduit 4C is selected to provide the straight passage of the pipe lines, the front cover 1 is rotated 90° relative to the casing 2, and remaining components of the diverter valve, by removing the bolts between the outlet flange 1B and the inlet flange 2A, repositioning the front cover 1 relative to the casing 2 and then reattaching the outlet flange 1B to the inlet flange 2A, and the rear cover 4 is positioned such that the outlet conduit 4C is perpendicular to the longitudinal axis of the straight passage of the pipe lines. As such, the passages defined by the front cover 1 and the outlet conduit 4C will be coaxial with the straight passage of the pipe lines. The inlet flange 1A and the outlet flange 4B will also be perpendicular to the longitudinal axis of the straight passage of the pipe lines.

To enable rotation of the front cover 1 by an angle of 90° relative to the casing 2, the number of bolt holes in the outlet flange 1B of the front cover 1 may be any number of sets of four equiangularly spaced bolt holes around the circumference of the outlet flange 1B and the inlet flange 2A. That is, one set of four bolt holes is formed spaced 90° apart from one another. Each bolt hole in each additional set is then angularly spaced from a respective one of these initial bolt holes by the same angle.

In another embodiment, the components of the diverter valve are constructed to require a 60° rotation of the front cover 1 relative to the casing 2 and remaining components in order to change straight passage from the outlet conduit 4B to the outlet conduit 4C or vice versa. As such, the number of bolt holes in the outlet flange 1B of the front cover 1 may be any number of sets of three equiangularly spaced bolt holes around the circumference of the outlet flange 1B and inlet flange 2A. That is, one set of three bolt holes is formed spaced 120° apart from one another. Each bolt hole in each additional set is then angularly spaced from a respective one of these initial bolt holes by the same angle.

In either configuration, since the straight passage of the diverter valve aligns with the straight passage of the pipe lines, collisions and adhesion of powder or particle to the inner walls of the diverter valve, as occur in conventional diverter valves described above, are avoided.

In some embodiments of the invention, whenever there is rotational movement of a flange relative to an adjacent flange, the surfaces of one or both of the adjacent flanges are constructed to improve the relative rotational movement. Specifically, in the invention, the inner tube 3 is rotated about the central axis causing the inlet flange 3A to be rotated relative to the outlet flange 1B and the outlet flange 3C to be rotated relative to the inlet flange 4A. Therefore, flat sliding surfaces are formed between the inlet flange 3A and the outlet flange 1B and between the outlet flange 3C and the inlet flange 4A. Between the other pairs of adjacent flanges which are fixed relative to one another, i.e., between the outlet flange 1B and the inlet flange 2A, between the outlet flange 2B and the inlet flange 4A and between the flange 4D and the mating flange of the actuator or operating device, any sealing construction may be used because sealing between adjacent, fixed flanges does not pose any particular problem which requires a novel solution.

To seal the diverter valve, the outlet flange 1B of the front cover 1 includes an annular groove 1C and the outlet flange 3C of the inner tube includes an annular groove 3E (see FIG. 1). An annular seal ring, e.g., made of plastic or metal depending on the material being transported and the hardness requirement thereof as discussed above, are arranged in each groove 1C, 3E. In addition, for a metal seal, one or more back-up O-rings may be arranged behind the metal seals to provide a resilient force which urges the metal seal against an opposed flat sliding surface. Thus, the O-ring behind a metal seal in the groove 1C would urge the metal seal therein against the flat sliding surface of the inlet flange 2A and the O-ring behind a metal seal in the groove 3E would urge the metal seal therein against the flat sliding surface of the inlet flange 4A.

The inlet flange 3A of the inner tube 3 rotates about the rotational axis of the inner tube 3 but does not move in a radial direction. As such, the material being transported over the inlet flange 3A does not pass into the clearance between the adjacent, contacting surfaces of the outlet flange 1B and the inlet flange 3A. Furthermore, these contacting surfaces can be machined accurately because their narrow area, so that a large pushing force which urges the metal seal ring or plastic seal ring in groove 1C against the flat sliding surface of the inlet flange 3A is not necessary. Also, the accurate machining prevents generation of large friction forces between the outlet flange 1B and the inlet flange 3A.

When the actuator or operating device rotates the stem 5 by 90° to change the alignment of the inner tube 3 from the outlet conduit 4B to the outlet conduit 4C or vice versa, the outlet flange 3C is rotated by 90° about the rotational axis of the inner tube 3. In view of its axial offset from the rotational axis, its radial position is changed thereby enabling the selective alignment with either the outlet conduit 4B or the outlet conduit 4C. The distance that outlet flange 3C moves relative to the inlet flange 4A is therefore relatively large. However, since the surface of the inlet flange 4A is flat, it is very easy to machine and/or grind accurately without any particularly expensive machining or grinding operations. Also, the surfaces of the metal seal ring or plastic seal ring arranged in the groove 3E opposite the sliding surface of the inlet flange 4A can be easily machined because the annular shape is simple and their size is relatively small.

Thus, flat surfaces for the abutting surfaces of the components which move relative to one another in the diverter valve in accordance with the invention are economically obtained, and amount of leakage gas between these abutting surfaces is drastically reduced in comparison to conventional diverter valves.

Another advantage of the diverter valve in accordance with the invention is that there is only one sliding point in comparison with ball valves in conventional diverter valves wherein there are three sliding points. Since each sliding points generates friction force and abrasion, reducing the number of friction points significantly increases the value and operation of the diverter valve in accordance with the invention. Therefore, theoretically, the torque required to turn the inner tube 3 in the diverter valve of the present invention is one third of that required to turn a ball valve in a conventional diverter valve, considering only the number of sliding points and disregarding other factors. Furthermore, the pushing force against the metal seal rings or plastic seal rings can be significantly reduced because of the presence of the flat, machined surfaces against which the seal rings are pushed. As a result, the torque required for the actuator or operating device to rotate the inner tube 3 of the present invention is much less than that required to rotate a conventional ball valve. This provides advantages relative to prior art diverter valves including ball valves in that the size of the actuator or operating device may be smaller and more compact, the cost of the actuator or operating device is less and the service life of the seal rings is longer.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A diverter valve for a material transportation system which includes pipe lines forming a straight passage having a longitudinal axis, the diverter valve comprising:
    a first cover defining an inlet passage;
    a second cover defining first and second outlet passages;
    an elongate casing connected at a first end to said first cover and at a second end to said second cover; and
    an inner tube arranged in said casing and having an inlet and an outlet, said inlet of said inner tube aligning with said inlet passage of said first cover, and said inner tube being rotatable to selectively align said outlet of said inner tube with said first outlet passage of said second cover or said second outlet passage of said second cover;
    wherein said first cover includes an inlet flange adapted to be connected to the pipe lines of the material transportation system, and an outlet flange inclined relative to said inlet flange of said first cover,
    wherein said casing includes an inlet flange connected to said outlet flange of said first cover,
    wherein said first outlet passage of said second cover includes a first outlet flange and said second outlet passage of said second cover includes a second outlet flange which is inclined relative to said first outlet flange of said first outlet passage;
    wherein said inner tube defines a straight passage having a central axis between said inlet and said outlet;
    wherein when said outlet of said inner tube is aligned with one of said first outlet passage and said second outlet passage of said second cover, a straight passage is defined throughout the entire diverter valve which is in coaxial alignment with the longitudinal axis of the straight passage of the pipe lines and said central axis of said straight passage of said inner tube;
    wherein when said outlet of said inner tube is aligned with one of said first outlet passage and said second outlet passage of said second cover to define said straight passage throughout the entire diverter valve, all inner surfaces of the diverter valve defining said straight passage throughout the entire diverter valve are disposed in parallel to the longitudinal axis of the straight passage of the pipe lines; and
    wherein an angle of inclination of said outlet flange of said first cover relative to said inlet flange of said first cover is set in accordance with an angle of inclination of said second outlet flange of said second outlet passage relative to said first outlet flange of said first outlet passage, such that definition of said straight passage throughout out the entire diverter valve is changeable between including said first outlet passage and including said second outlet passage by rotating said first cover relative to said casing by a predetermined amount in accordance with said angle of inclination of said outlet flange of said first cover relative to said inlet flange of said first cover.

2. The diverter valve of claim 1, wherein said central axis of said straight passage is inclined relative to an axis about which said inner tube is rotated.

3. The diverter valve of claim 2, wherein said casing has a truncated conical shape.

4. The diverter valve of claim 1, wherein said casing further includes an outlet flange connected to said second cover, said inlet flange of said casing defines a circular opening, and said outlet flange of said casing defines a circular opening having a larger diameter than said circular opening defined by said inlet flange of said casing.

5. The diverter valve of claim 1, wherein said outlet flange of said first cover includes a groove, and wherein the diverter valve further comprises a seal ring arranged in said groove facing said inlet flange of said casing.

6. The diverter valve of claim 1, wherein said casing further includes an outlet flange connected to said second cover, and wherein said inlet flange of said casing and said outlet flange of said casing each define a plane at an edge which is substantially perpendicular to a rotational axis of said inner tube.

7. The diverter valve of claim 1, further comprising bolts for connecting said casing to said first and second covers.

8. The diverter valve of claim 1, wherein said inner tube includes an inlet flange and an outlet flange, said inlet flange and said outlet flange each defining a plane at an edge which is perpendicular to a rotational axis of said inner tube, wherein the rotational axis of said inner tube passes through a center of an opening defined by said inlet flange of said inner tube, wherein a center of an opening defined by said outlet flange of said inner tube is apart from the rotational axis of said inner tube, such that said central axis of said straight passage of said inner tube connects the center of said inlet flange of said inner tube and the center of said outlet flange of said inner tube, and is inclined relative to the rotational axis of said inner tube.

9. The diverter valve of claim 8, wherein said inlet flange of said first cover defines a plane at an edge which is perpendicular to said central axis of the straight passage defined by said inner tube, and said outlet flange of said inner tube defines a plane at an edge which is perpendicular to said rotational axis of said inner tube.

10. The diverter valve of claim 1, further comprising a rotation mechanism connected to said inner tube and arranged to rotate said inner tube relative to said casing.

11. The diverter valve of claim 10, wherein said rotation mechanism comprises a rib projecting from said inner tube and a stem coupled to said rib and extending through an aperture in said second cover, said stem being adapted to connect to an actuator or operating device located outside of said casing.

12. The diverter valve of claim 1, wherein said inner tube includes an outlet flange connected to said second cover, wherein said outlet flange of said inner tube includes a groove, and wherein the diverter valve further comprises a seal ring arranged in said groove facing said second cover.

13. The diverter valve of claim 1, wherein said outlet flange of said first cover includes a first groove, and said inner tube includes an outlet flange connected to said second cover, said outlet flange of said inner tube including a second groove, wherein the diverter valve further comprises:

a first seal ring arranged in said first groove facing said inlet flange of said casing; and a second seal ring arranged in said second groove facing said second cover, said first and second seal rings including at least one of metal and plastic.

14. The diverter valve of claim 13, wherein said inlet flange of said casing and said second cover have flat, two-dimensional surfaces facing said first and second seal rings, respectively.

15. The diverter valve of claim 1, wherein said inlet flange of said casing and said outlet flange of said first cover include bolt holes and are connected together by bolts extending through aligning ones of said bolt holes, the number of said bolt holes in said outlet flange being any number of sets of four equiangularly spaced bolt holes around a circumference of said outlet flange when a rotation of 90° of said first cover relative to said casing causes definition of said straight passage throughout the entire diverter valve to switch between including said first outlet passage and including said second outlet passage.

16. The diverter valve of claim 1, wherein said inlet flange of said casing and outlet flange of said first cover include bolt holes and are connected together by bolts extending through aligning ones of said bolt holes, the number of said bolt holes in said outlet flange being any number of sets of three equiangularly spaced bolt holes around a circumference of said outlet flange when a rotation of 60° of said first cover relative to said casing causes definition of said straight passage throughout the entire diverter valve to switch between including said first outlet passage and including said second outlet passage.

17. The diverter valve of claim 1, wherein said inner tube is enclosed entirely within said casing.

* * * * *